3,268,452
VANADIUM-CONTAINING GARNETS
Seymour Geller, Morristown, N.J., assignor to Bell Telephone Laboratories, Incorporated, New York, N.Y., a corporation of New York
Filed July 10, 1963, Ser. No. 293,962
2 Claims. (Cl. 252—62.5)

This invention relates to a new series of ferrimagnetic compositions of matter and to methods for the production of the same. Structurally, the materials of this invention are identical to prototype or substituted yttrium-iron garnet and may be represented as members of this known class in which varying amounts of iron have been replaced by vanadium.

Compositions of this invention may be represented by the general formula $$\{M_{3-2x}Ca_{2x}\}[Fe_2](Fe_{3-x}V_x)O_{12}$$

where M is yttrium, a rare earth, or bismuth; and where $x$ is from 1.01 to 1.5 when M is yttrium or a rare earth and where $x$ is from 0.8 to 1.5 when M is bismuth. These compositions have moments of from zero to at least 2.3 Bohr-magnetrons at absolute zero. Curie points range from 220° C. up to about 270° C. Other magnetic properties, as well as suitable procedures for making these compositions, are set forth herein.

The description of this invention is expedited by reference to the accompanying drawing, in which.

Figure 1:
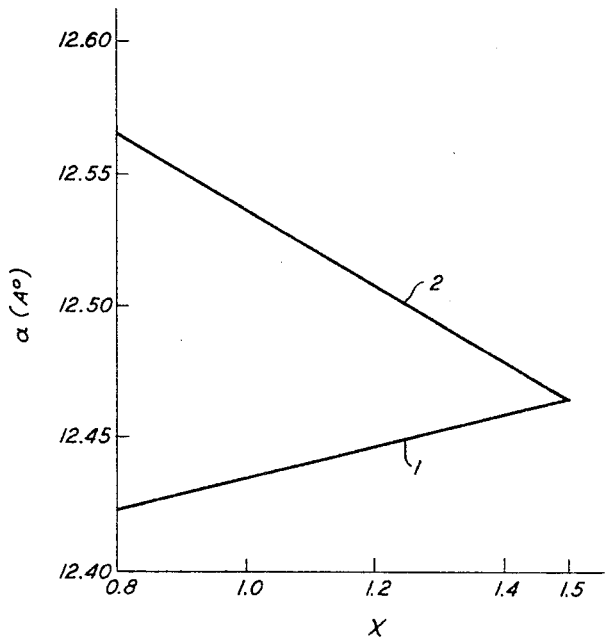
FIG. 1 is a plot of lattice constant, $a$, vs. composition, $x$, for two exemplary compositional series herein.

Referring again to FIG. 1, coordinates are lattice constant in angstroms vs. $x$ in the general formula above as atoms per formula unit. Curve 1 is plotted for the system in accordance with the general formula in which M is yttrium. Curve 2 is a similar plot for the system in which M is bismuth. Curves 1 and 2 join at the end member $\{CA_3\}[Fe_2](Fe_{1.5}V_{1.5})O_{12}$. All lattice constants plotted on FIG. 1 are higher than that of yttrium-iron garnet (YIG), with increasing vanadium causing an increase in the value of the lattice constant where M is yttrium and a decrease where M is bismuth. The reported lattice constant values are useful in converting the magnetization units here reported (Bohr-magnetrons per formula unit) to volume or weight units.

Figure 2:
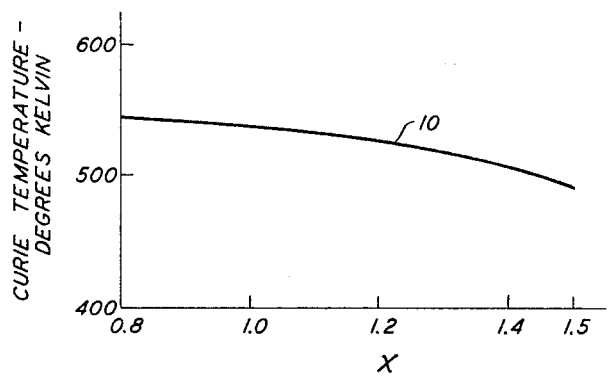
FIG. 2 is a plot of Curie temperature vs. composition, $x$, for these materials.

FIG. 2, on coordinates of Curie temperature in degrees Kelvin on the ordinate and composition in units of $x$ defined as in FIG. 1 on the abscissa, is a plot showing the dependence of Curie temperature on composition. Curve 10 of this plot is equally applicable to all included compositions.

Figure 3:
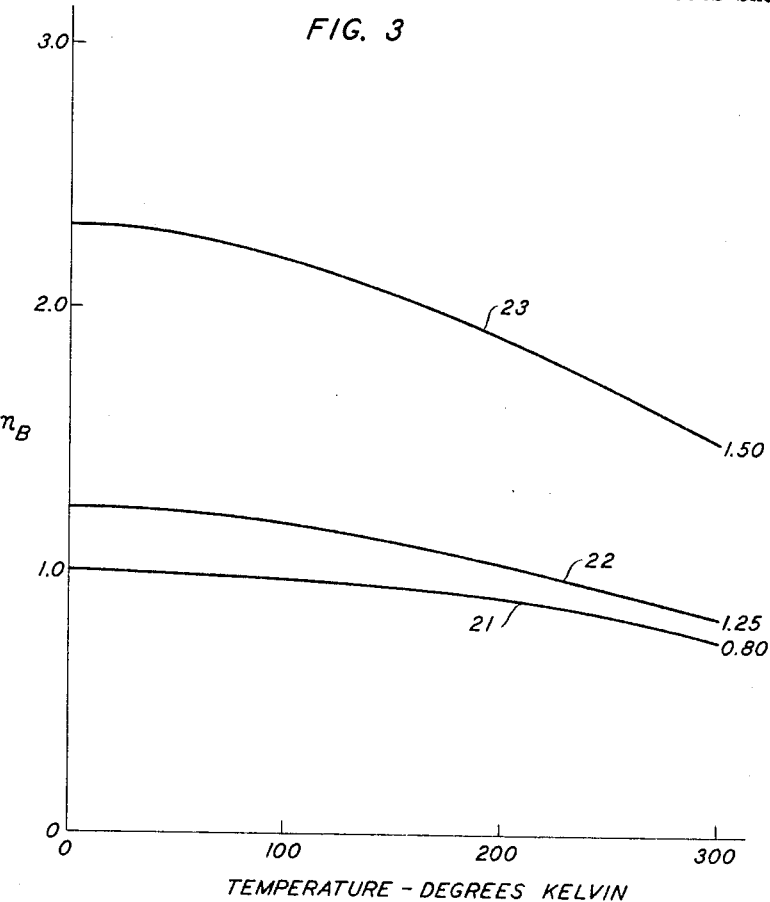
FIG. 3 is a plot of spontaneous magnetization ($n_B$) vs. temperature for certain included compositions.

FIG. 3 is in units of spontaneous magnetization in Bohr-magnetrons per formula unit on the ordinate and temperature in degrees Kelvin on the abscissa. The plot includes three curves 21, 22 and 23, showing the dependence of this parameter on temperature for the compositions in which M equals bismuth and $x$ equals 0.8 (curve 21), in which M equals bismuth or yttrium and $x$ equals 1.25 (curve 22) and for the end member $$\{Ca_3\}[Fe_2](Fe_{1.5}V_{1.5})O_{12}$$

(curve 23). It is significant that all curves on this figure indicate a relative insensitivity of magnetization with temperatures as compared, for example, with YIG, which has a larger zero magnetization, or as compared with analogous silicon-substituted garnets having lower Curie points.

Figure 4:
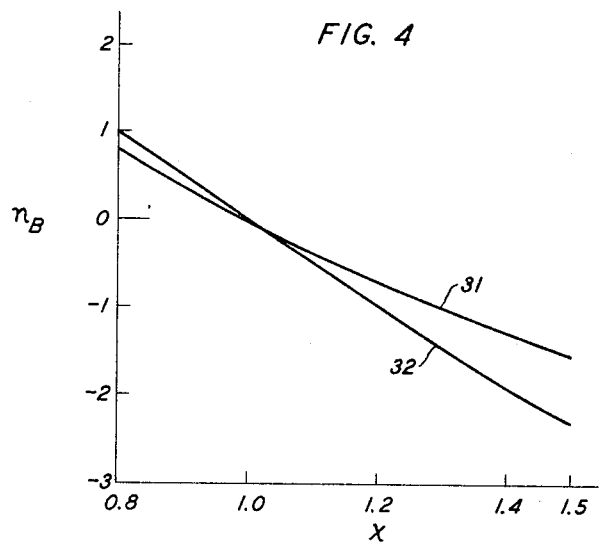
FIG. 4 is a plot of spontaneous magnetization vs. composition for two different temperatures.

FIG. 4 is on coordinates of spontaneous magnetization in units of Bohr-magnetrons per formula unit ($n_B$) and composition, again expressed as the quantity $x$ in the general formula in which M is bismuth or yttrium. Curves 31 and 32 show the relationship at room temperature and absolute zero, respectively.

The curves of FIG. 4 show an interesting characteristic of the systems herein. The cross-over between positive and negative magnetization values for $x=1$ results from the fact that vanadium substitutes for iron in the tetrahedral site. At $x=1$ the number of iron atoms in the tetrahedral and octahedral sites are equal, so resulting in a magnetization of zero. For lesser values, as in the bismuth system, there are more iron atoms in the tetrahedral site, so resulting in a positive moment in accordance with the usual convention applied to YIG. For greater substitutions, iron in the octahedral site dominates, so resulting in an opposite moment, here indicated as having a negative direction.

The following examples set forth specific conditions found suitable for the preparation of certain exemplary materials herein.

Example 1

The material $\{Ca_3\}[Fe_2](Fe_{1.5}V_{1.5})O_{12}$ was prepared from the following starting materials:

| | Gram |
|---|---|
| $CaCO_3$ | 1.3003 |
| $Fe_2O_3$ | 0.2795 |
| $V_2O_5$ | 0.1364 |

These were ground together in an agate mortar, after which they were compacted in a ball mill. The pellet was calcined over a temperature range of from 500 to 900° C. following a schedule such that the maximum temperature was attained in a period of about one hour.

The calcined pellet was then fired in accordance with the following schedule:

| ° C.: | | Hours |
|---|---|---|
| 1025 | reground | ½ |
| 1140 | do | 65 |
| 1140 | do | 43 |
| 1140 | | 4 |

The final product was single-phase garnet as determined by X-ray diffraction analysis. Characterizing data for this material is included in each of FIGS. 1 through 4.

While the entire indicated schedule was required to completely eliminate any trace of second phase material, the X-ray technique used was extremely sensitive. For most purposes the product would be considered essentially single phase after a 44 hour period of the first 1140° C. firing.

Example 2

The composition $\{Y_{0.5}Ca_{2.5}\}[Fe_2](Fe_{1.75}V_{1.25})O_{12}$ was prepared from the following starting materials:

| | Gram |
|---|---|
| $Y_2O_3$ | 1.0565 |
| $CaCO_3$ | 0.2502 |
| $Fe_2O_3$ | 0.2994 |
| $V_2O_5$ | 0.1137 |

These materials were ground, compacted, and calcined as in Example 1. Four successive firing steps were carried out in the preparation of the specific example here under discussion. After each firing the material was examined by X-ray, was reground, and recompacted. This was, of course, an experimental procedure and was part of a study to determine optimum conditions required for single-phase product. Temperatures and times of each firing were:

| °C. | Hours |
|---|---|
| 1100 | ½ |
| 1160 | 1½ |
| 1175 | 16 |
| 1160 | 16 |

Example 3

The composition $\{Bi_{0.5}Ca_{2.5}\}[Fe_2](Fe_{1.75}V_{1.25})O_{12}$ was prepared from the following starting materials:

| | Gram |
|---|---|
| $Bi_2O_3$ | 1.1165 |
| $CaCO_3$ | 0.2502 |
| $Fe_2O_3$ | 0.2994 |
| $V_2O_5$ | 0.1137 |

The starting ingredients were ground, compacted, and calcined as in Examples 1 and 2. The sample was fired at 1050° C. for ¾ hour, was X-ray analyzed, reground, and recompacted, was fired at 1090° C. for 1½ hours, was fired at 1150° C. for 2½ hours, was reground and recompacted, and was finally fired at 1165° C. for 20 hours. Again, the particular schedule was designed to reveal minimum conditions necessary for producing single-phase material. The final product was a homogeneous body of single-phase garnet material. Characteristics of this material are included in each of the four figures.

Each of the enumerated examples relates to the preparation of a 0.001 mol quantity of the composition indicated. Schedules varied from example to example for the reasons noted. While each example is directed to the preparation of a homogeneous single-phase garnet, it is well known that commercial utility oftentimes does not require so perfect a material. In fact, many commercial ferrimagnetic materials show the pronounced presence of one or more second phases. Accordingly, it is not intended that the invention be limited to the preparation of the single-phase garnet. The following discussion relates to firing conditions appropriate to the preparation of the magnetic compositions herein. Broader ranges include conditions which, while resulting in a material showing pronounced magnetic characteristics, oftentimes approaching those plotted in the figures, may contain one or more second phases. The examples utilize specific starting materials which were available in the laboratory. Accordingly, calcium was introduced by way of a carbonate, with the other elements being introduced as oxides. Other compounds yielding the elemental materials under the described firing conditions are equally suitable and may be substituted.

Garnet compositions within the general formula set forth are prepared by first grinding, compacting, and calcining in accordance with any suitable procedure, followed by firing over the temperature range of from 950° C. to 1300° C. for a minimum time of from 15 minutes to ½ hour, the shorter time corresponding with the higher temperature. As is well known, maximum time is dictated by expediency. For the purpose of this disclosure, it is considered that the very slight advantage gained by firing at times in excess of 150 hours does not justify the added expense. Accordingly, such period is to be considered a maximum for these purposes. It has been found that firing over a range of from 1000 to 1200° C. for a period of from 24 to 100 hours results in an essentially single-phase product. Accordingly, such are considered to be preferred ranges for the purpose of this invention.

The description of this invention has been set forth in terms of the ceramic or polycrystalline material. It is to be understood, however, that the scope of the appended claims is not to be so limited. By using an appropriate flux system, single crystals of various of the compositions herein have been grown.

The invention has necessarily been described in terms of a limited number of embodiments. Variations on these embodiment, all within the general teachings herein, are apparent to any person skilled in the art. It has been noted, for example, that commercially suitable materials prepared in accordance with these teachings, may not be single-phase garnets. The tolerable amount of such second-phase is to be determined solely in terms of the application to which the materials is to be put. Under certain circumstances, such second-phase may be desirable for the purpose, for example, of diluting the magnetic properties in the material and, accordingly, may be deliberately added. In general, there are no materials which are necessarily to be avoided, either as contaminants or intentionally included, ingredients. In fact, certain ingredients serving purposes already recognized in related YIG and substituted YIG systems may be included. Such ingredients include, for example, aluminum, gallium, scandium, et cetera. Reduced moment is a desideratum in certain low frequency devices operating on the parametric principle. It is to be noted, too, that calcium, while preferred from the standpoint of atomic size, is merely a compensating ion permitting the introduction of vanadium into the structure. Any compensating ion in size and amount which may be accepted by the structure may be substituted.

What is claimed is:

1. Composition of matter of the garnet structure represented by the formula $$\{M_{3-2x}Ca_{2x}\}[Fe_2](Fe_{3-x}V_x)O_{12}$$

where M is at least one element selected from the group consisting of yttrium, the rare earths, and bismuth; where $x$ is from 1.01 to 1.5 when M is an element selected from the group consisting of yttrium and the rare earths; and where $x$ is from 0.8 to 1.5 when M is bismuth.

2. Composition of matter of the garnet structure represented by the formula $$\{Ca_3\}[Fe_2](Fe_{1.5}V_{1.5})O_{12}$$

References Cited by the Examiner
UNITED STATES PATENTS

| 2,714,580 | 8/1955 | Dean et al. | 252—62.5 |
| 3,003,966 | 10/1961 | Van Uitert | 252—62.5 |

TOBIAS E. LEVOW, *Primary Examiner.*

MAURICE A. BRINDISI, *Examiner.*

R. D. EDMONDS, *Assistant Examiner.*